(12) United States Patent
Usami

(10) Patent No.: US 6,401,921 B1
(45) Date of Patent: Jun. 11, 2002

(54) TAPE MEASURE DISPLAY CONTAINER AND TAPE MEASURE

(75) Inventor: Tsutomu Usami, Moriyama (JP)

(73) Assignee: KDS Corporation, Kyoto (JP)

( * ) Notice: Subject to any disclaimer, the term of this patent is extended or adjusted under 35 U.S.C. 154(b) by 0 days.

(21) Appl. No.: 09/604,631

(22) Filed: Jun. 27, 2000

(51) Int. Cl.$^7$ .......................... B65D 73/00; A45C 11/26
(52) U.S. Cl. ...................... 206/349; 206/461; 206/807
(58) Field of Search .................... 206/1.5, 461, 462, 206/464, 470, 471, 349, 807; 33/755, 756, 760

(56) References Cited

U.S. PATENT DOCUMENTS

| | | | |
|---|---|---|---|
| 5,129,516 A | * 7/1992 | Theros | 206/471 |
| 5,388,741 A | * 2/1995 | Hillinger | 206/349 |
| 5,593,036 A | * 1/1997 | Dyble et al. | 206/462 |
| 5,890,594 A | * 4/1999 | Hansen et al. | 206/470 |
| 6,011,472 A | 1/2000 | Pendergraph et al. | |

\* cited by examiner

Primary Examiner—Luan K. Bui
(74) Attorney, Agent, or Firm—John R. Benefiel

(57) ABSTRACT

A tape measure (3) is inserted in a concavity (2a) in a transparent member (2)(A). A cardboard base (4) is inserted so that the belt clip (3) is led from a cardboard base hole (4a) out to the back side of the cardboard base (4)(B). Next, while inserting the belt clip into the insertion hole of the belt clip engagement member (1), in the vicinity of the tip portion whereof a belt clip insertion hole (1b) has been provided, the belt clip engagement member (1) is pushed in between the cardboard base (4) and the belt clip (3a). The latching piece (1c) advances while pushing the belt clip (3a) up, and, when the latching piece (1c) mates in a hole (3b) in the belt clip, the belt clip which has been pushed up returns to its original state by elastic force, whereupon the belt clip engagement member is attached in the prescribed position (D). By the belt clip engagement member being engaged in the belt clip, the tape measure cannot be removed from the cardboard base.

12 Claims, 14 Drawing Sheets

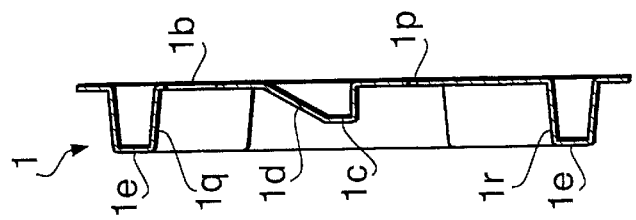
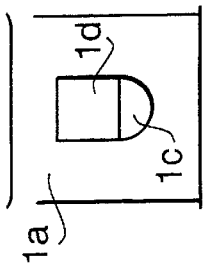
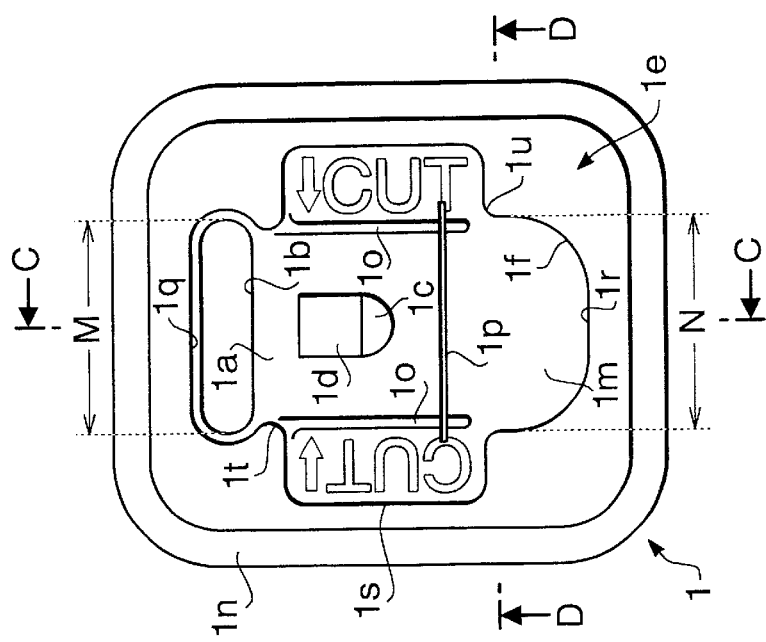
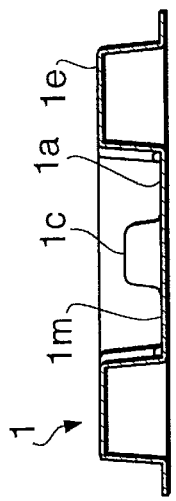
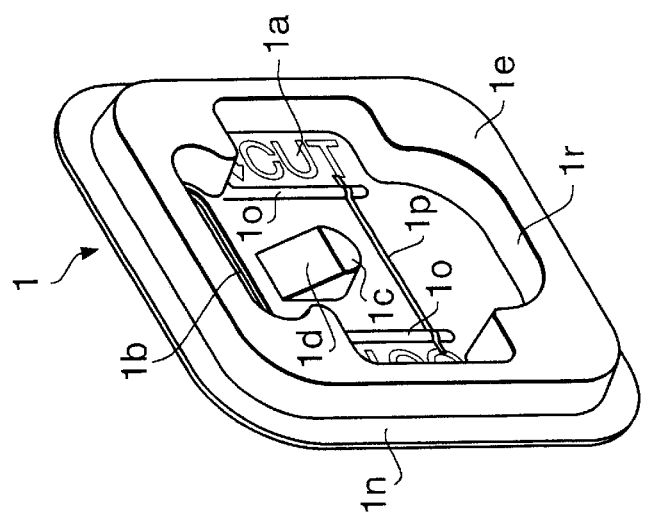

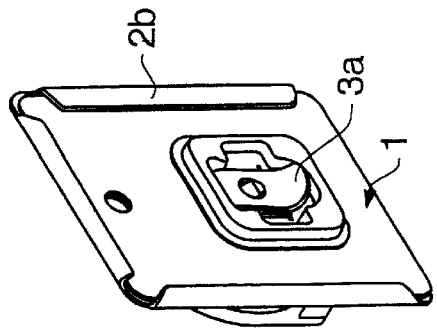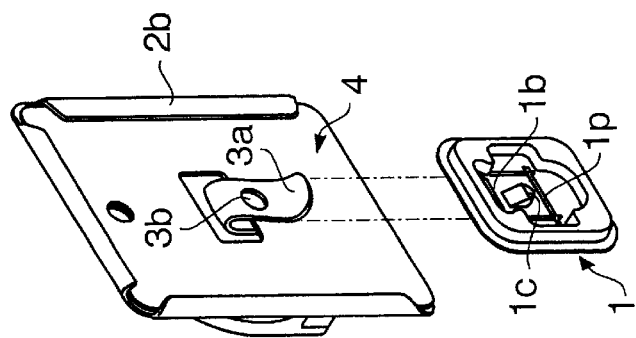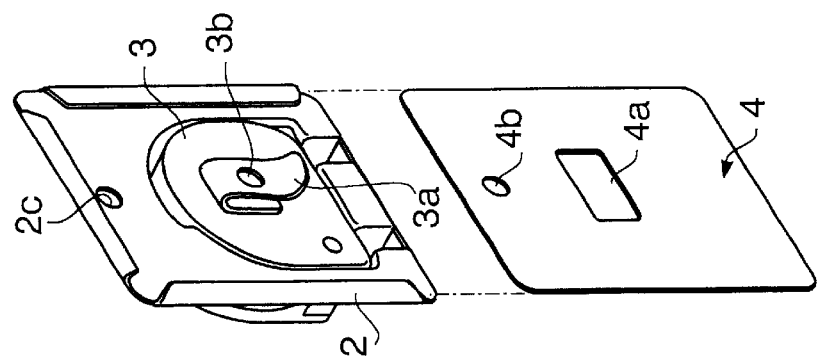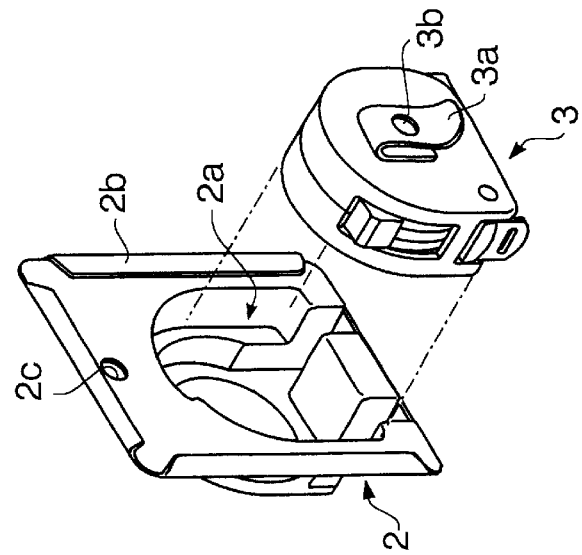

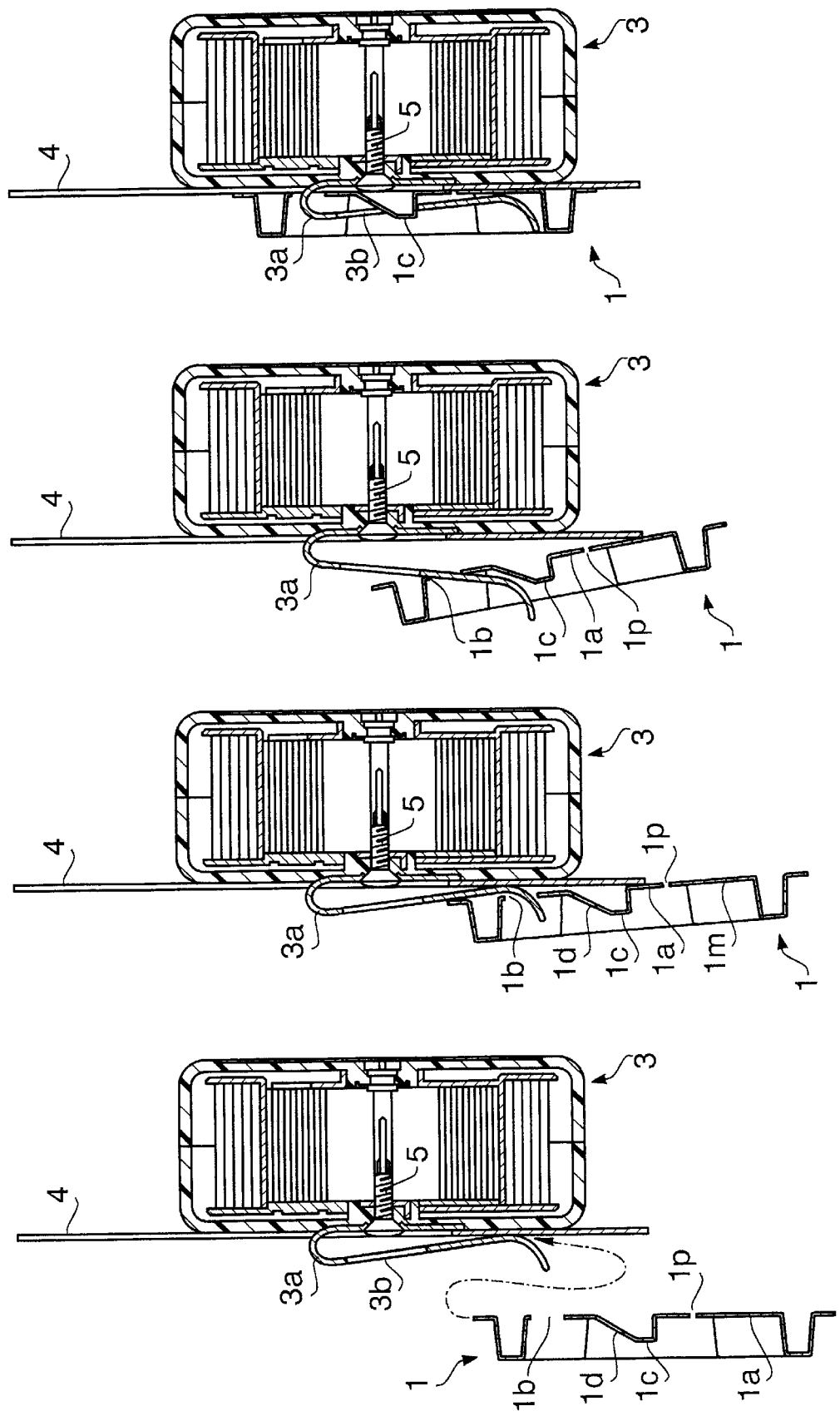

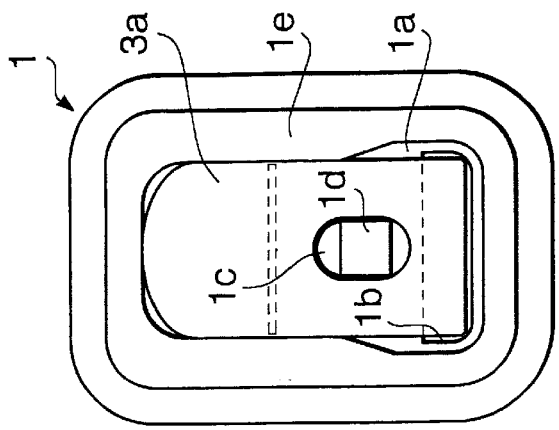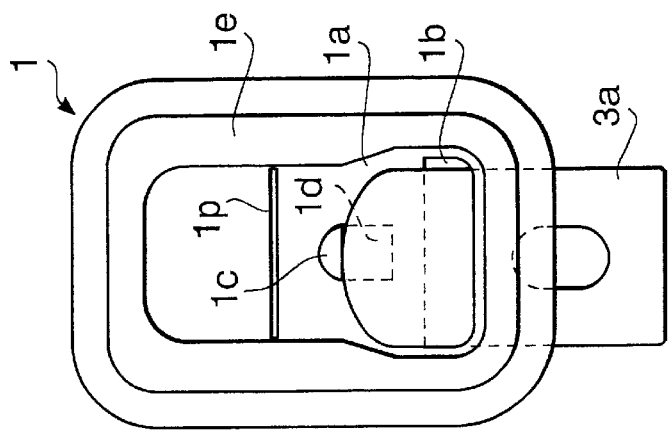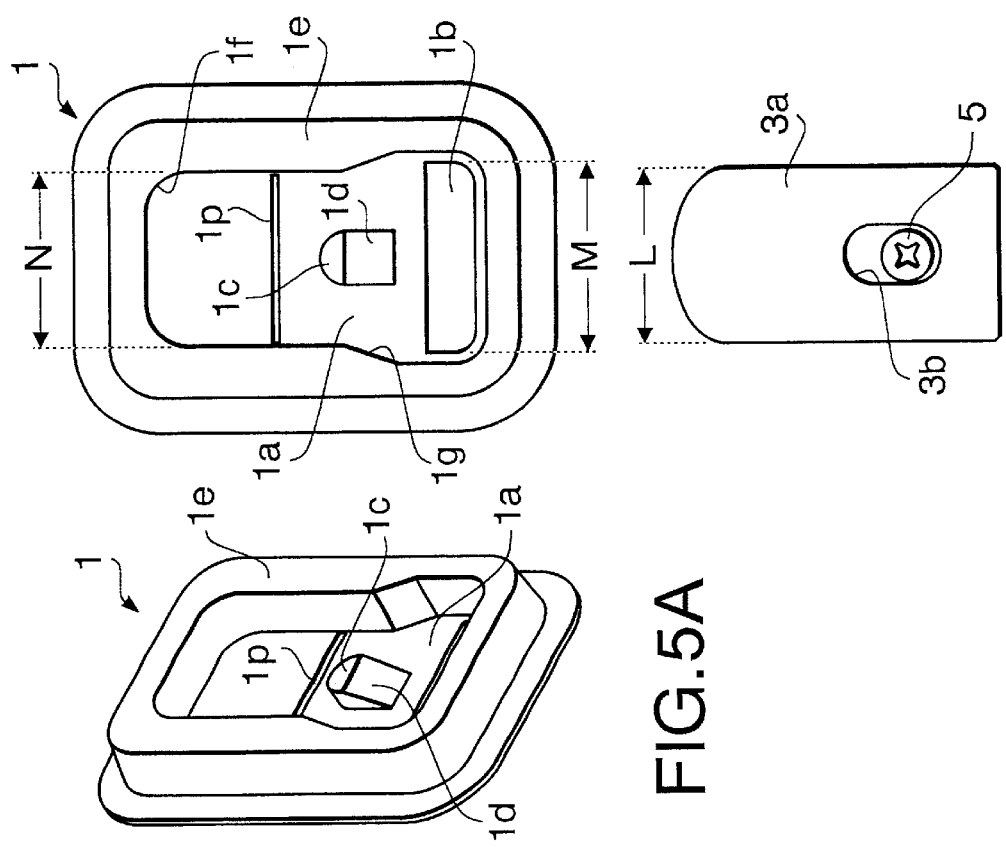

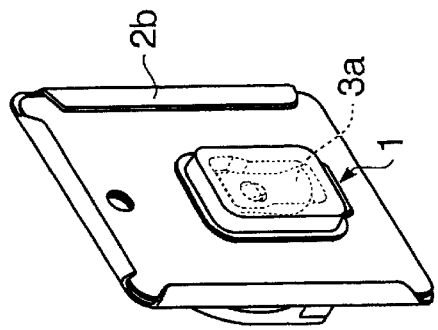
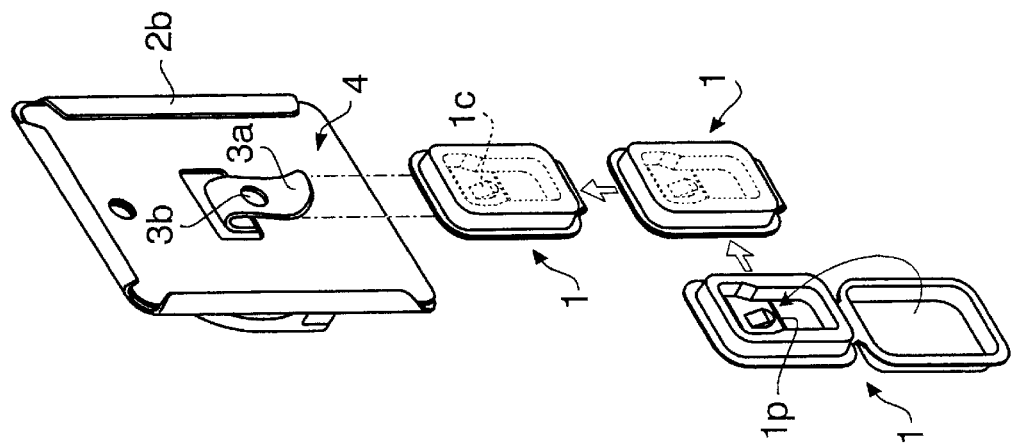
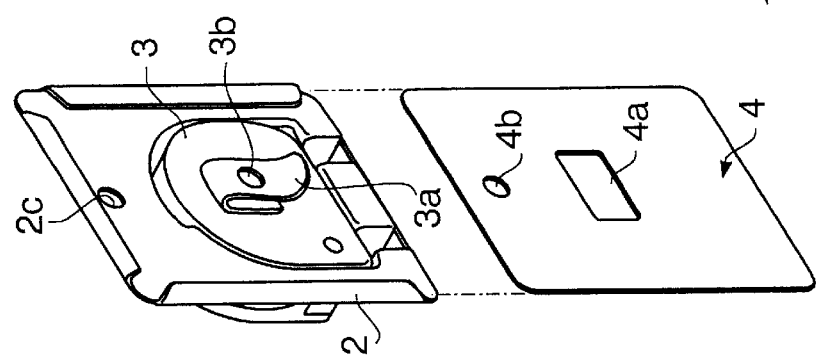
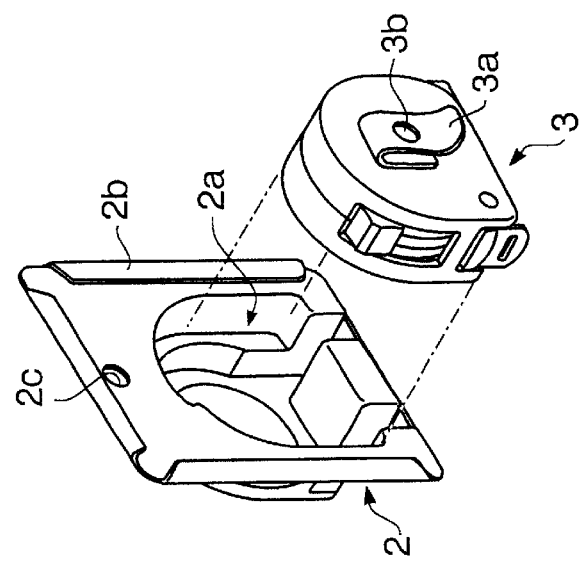
FIG.7D
FIG.7C
FIG.7B
FIG.7A

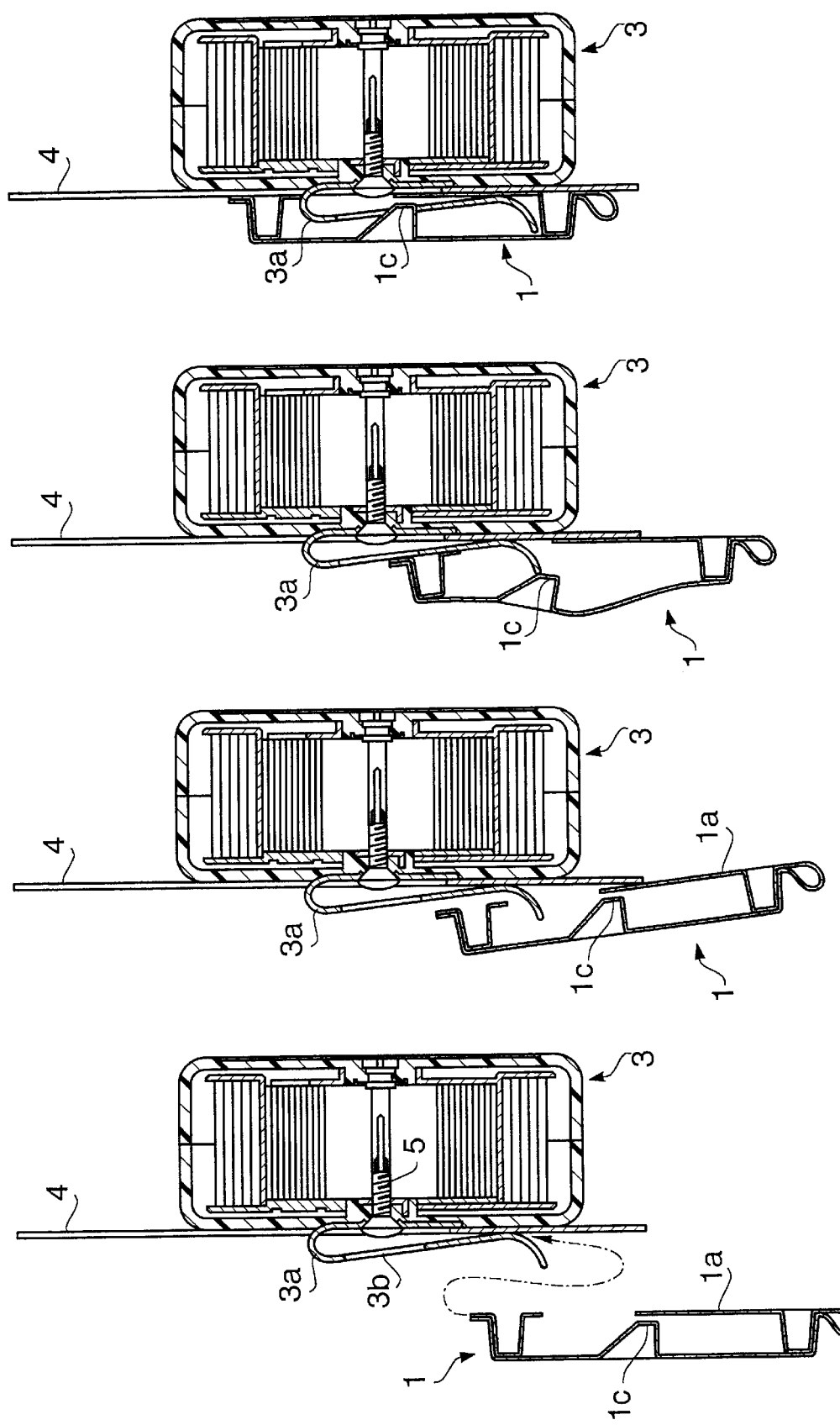

TAPE MEASURE DISPLAY CONTAINER AND TAPE MEASURE

BACKGROUND OF THE INVENTION

1. Field of the Invention

This invention relates to a tape measure display container, but particularly to a packaging form display container that deters theft, and to a tape measure accommodated in that display container.

2. Description of the Related Art

Packaging forms for the sale of tape measures at retail stores and the like are changing from box packaging wherein the contents are not visible to film pack packaging wherein the contents are visible. Using packaging containers comprising a cardboard base and a transparent material wherein is formed a concavity capable of accommodating the tape measure, the edges whereof are folded back to join the peripheral edge of the cardboard base, the tape measure can be packaged and displayed hanging up. The volume of sales of tape measures packaged in film packs handled in large supermarkets and DIY shops is growing year by year. In large supermarkets and DIY shops, the display location is removed some distance from the register, as a consequence whereof loss due to theft in the stores is increasing.

The modus operandi employed by the thieves is to remove the transparent material portion of the film pack packaging from the cardboard base, remove the tape measure that is the article contained, leave the transparent material and cardboard base hanging in the store, and act as though the tape measure was carried into the store from the outside, thus making it difficult to determine whether or not it is a stolen item.

There is also a form of display wherewith a simple display container is used and the tape measure is attached only to the cardboard base without using a film pack. In the present invention, such a cardboard base that is of such form that the tape measure is displayed using only the cardboard base is also called a display container. With a form wherewith no film pack is used, the tape measure can easily be removed from the cardboard base, wherefore the danger of theft is great.

Store owners have combated such theft as this using mirrors and augmenting their surveillance staff, but such measures result in increased costs, and the current situation is such that adequate attention cannot be directed to all of the large number of articles.

Given this situation, there is a demand for theft-deterrent packaging forms. One possible countermeasure is to make it difficult to separate the transparent material portion and the cardboard base by increasing the number of staples used to join the two together. However, staplers are not very effective in completely securing the transparent material portion to the cardboard base, and there is also an environmental problem in that prudent disposal becomes difficult.

U.S. Pat. No. 6,011,472 issued to Pendergraph et al. discloses a package wherewith the tape measure is accommodated in a synthetic resin cover, and that synthetic resin cover is bonded between two pieces of cardboard. The synthetic resin cover is made to protrude from an opening in the front cardboard, the accommodated tape measure is made visible from the front, and the periphery of the synthetic resin cover is sandwiched between the front cardboard and the back cardboard and secured. Also, the belt clip of the tape measure is made to protrude from an opening in the back cardboard, and, using the elastic force of the belt clip, a blister pack accommodating electronic article surveillance (EAS) is secured to the back cardboard.

However, because two pieces of cardboard are used, and the synthetic resin cover is secured to the cardboard pieces by bonding, packaging costs tend to rise.

In the blister pack, moreover, an opening is formed to permit insertion of the belt clip of the tape measure and a ramp is formed for opening the belt clip against the elastic force. However, in order to be able to insert the belt clip from the opening in the blister pack, open the belt clip while engaging it with the ramp, and insert the blister pack between the belt clip and the cardboard, the blister pack must have adequate strength, making higher cost unavoidable.

SUMMARY OF THE INVENTION

An object of the present invention is to provide a display container wherewith, by the addition of one small part to the conventional packaging form, the tape measure can be easily attached to the cardboard base, and the tape measure cannot be easily removed.

Another object of the present invention is to provide a display container configured such that a metal belt clip does not strike other products, wherewith scratching other products can be prevented without the use of scratch-preventing parts.

Still another object of the present invention is to provide a tape measure that is accommodated in such a display container.

According to one aspect of the present invention, there is provided a tape measure display container including: a cardboard base having a hole unit therein such that the belt clip of a tape measure can be inserted in the hole unit and the belt clip can be led out to the back side of the cardboard base; an insertion piece having a belt clip engagement member for engaging the belt clip that has been so led out to the back side, which belt clip engagement member is passed through a belt clip insertion orifice and inserted between the belt clip and the back side of the cardboard base; and a latching piece that is latched to the belt clip hole when the insertion piece is inserted.

The tape measure display container may be elastically deformable in the vicinity of the latching piece. The belt clip insertion orifice may be configured as a belt clip insertion hole. The belt clip engagement member may include a sidewall for enclosing the belt clip. The tape measure display container may have a transparent member, the edges of which are folded to join to the peripheral edges of the cardboard base, having formed therein a concavity capable of accommodating the tape measure.

The invention also provides a tape measure accommodated in the tape measure display container described above.

As is evident from the foregoing description, by adding a belt clip engagement member to the conventional packaging form, benefits are realized in that the tape measure cannot be easily removed, and the metal belt clip is prevented from striking other products, so that scratching other products can be prevented without using a scratch-prevention part.

BRIEF DESCRIPTION OF THE DRAWINGS

FIGS. 1(A) to 1(E) are a set of diagrams useful to describe a first embodiment of a belt clip engagement member used in the display container according to the present invention; specifically FIG. 1(A) illustrates a perspective view, FIG. 1(B) illustrates a plan view, FIG. 1(C) illustrates a cross-sectional view taken along the line C—C in FIG. 1(B), FIG. 1(D) illustrates a cross-sectional view taken along the D—D line in FIG. 1(B), and FIG. 1(E) is a diagram showing the insertion piece cut away;

FIGS. 2(A) to 2(D) are a set of diagrams useful to describe one example of a procedure for assembling a tape measure display container using the belt engagement member in the first embodiment; specifically FIG. 2(A) illustrates a condition before the tape measure is placed in a transparent casing, FIG. 2(B) illustrates a condition before a cardboard is engaged in the transparent casing, FIG. 2(C) illustrates a condition before a belt clip engagement member is engaged in a belt clip; and FIG. 2(D) illustrates a complete package;

FIGS. 3(A) to 3(D) are a set of cross-sectional views useful to describe the insertion process for the belt clip engagement member 1 in FIG. 2(C); specifically FIG. 3(A) illustrates a condition prior to insertion of the belt clip engagement member, FIG. 3(B) illustrates a condition when starting the insertion of the belt clip, FIG. 3(C) illustrates a condition when the belt clip engagement member is further pushed into the engagement direction, and FIG. 3(D) illustrates a condition when the belt clip engagement member is completely attached;

FIG. 4(A) illustrates an exploded perspective view of a condition before the tape measure is engaged on the cardboard, FIG. 4(B) illustrates a condition before the belt clip engagement member is attached to the cardboard, FIG. 4(C) illustrates a condition when the belt clip engagement member is completely attached;

FIGS. 5(A) to 5(D) are a set of diagrams useful to describe a second embodiment of a belt clip engagement member used in the display container according to the present invention; specifically FIG. 5(A) illustrates a perspective view, FIG. 5(B) illustrates a plan view without a belt clip, FIG. 5(C) also illustrates a plan view with the belt clip at a half engaged position and FIG. 5(D) illustrates a plan view with the belt clip at a full engaged position;

FIG. 6(A) illustrates a perspective view before folding, FIG. 6(B) illustrates a vertical cross-sectional view and FIG. 6(C) illustrates a perspective view when folded;

FIGS. 7(A) to 7(D) are a set of diagrams for describing one example of a procedure for assembling a tape measure display container using the belt engagement member in the third embodiment; specifically FIG. 7(A) illustrates an exploded perspective view of a condition before the tape measure is placed in the transparent casing, FIG. 7(B) illustrates a condition before the cardboard is engaged in the transparent casing, FIG. 7(C) illustrates a condition when the belt clip engagement member is attached to the belt clip, and FIG. 7(D) illustrates when the belt clip engagement member is completely attached;

FIG. 8(A) illustrates the belt clip engagement member before folding and FIG. 8(B) illustrates the same after folding;

FIG. 9(A) illustrates a condition before the tape measure is placed into the transparent package, FIG. 9(B) illustrates a condition before the cardboard base is engaged, FIG. 9(C) illustrates a condition before the belt clip engagement member is engaged, and FIG. 9(D) illustrates a condition after the belt clip engagement member is engaged;

FIGS. 10(A) to 10(D) are a set of cross-sectional diagrams for describing one example of a procedure for assembling a tape measure display container using the belt engagement member in the fourth embodiment; specifically FIG. 10(A) illustrates a condition before the belt clip engagement member is engaged in the belt clip, FIG. 10(B) illustrates the belt clip engagement member first engaged in the belt clip, FIG. 10(C) illustrates the belt clip engagement member further engaged in the belt clip, and FIG. 10(D) illustrates the complete condition;

FIG. 11(A) illustrates a condition before the tape measure is put in the transparent casing, FIG. 11(B) illustrates a condition before the cardboard is engaged into the transparent casing, FIG. 11(C) illustrates a condition before the belt clip engagement member is engaged into the belt clip, and FIG. 11(D) illustrates the complete package;

FIG. 12(A) illustrates a condition before the belt clip engagement member is engaged in the belt clip, FIG. 12(B) illustrates a condition when the belt clip engagement member is first engaged in the belt clip, FIG. 12(C) illustrates a condition when the belt clip engagement member is further engaged in the belt clip, and FIG. 12(D) illustrates a complete package;

FIG. 13(A) illustrates a condition before the tape measure is placed into the transparent casing, FIG. 13(B) illustrates a condition before the cardboard is engaged into the transparent casing, FIG. 13(C) illustrates a condition before the belt clip engagement member is engaged in the belt clip, and FIG. 13(D) illustrates the complete package; FIG. 14(A) illustrates a condition before the belt clip engagement member is engaged in the belt clip, FIG. 14(B) illustrates a condition when the belt clip engagement member is first engaged in the belt clip, FIG. 14(C) illustrates a condition when the belt clip member is further engaged in the belt clip, and FIG. 14(D) illustrates the complete package.

DESCRIPTION OF THE PREFERRED EMBODIMENTS

Figure 4C:
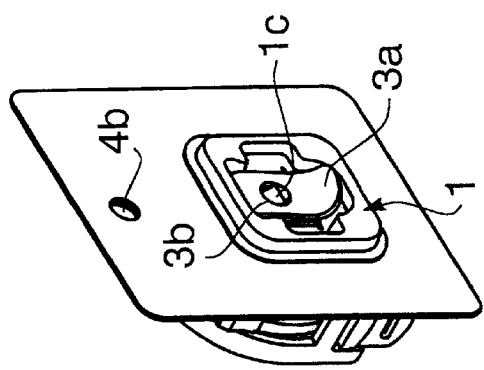
FIGS. 4(A) to 4(C) are a set of illustrations useful to describe another example of a procedure for assembling a tape measure display container using the belt clip engagement member in the first embodiment; specifically

Preferred embodiments of the present invention are now described in detail with reference to the attached drawings.

Referring to FIGS. 1(A) to 1(E), a belt clip engagement member 1 is formed in a square shape as seen in the plan view (FIG. 1(B)). The belt clip 1 has a bottom surface part 1m formed in the center thereof, a sidewall part 1e formed about the periphery of that bottom surface part 1m, and a flange part 1n formed about the periphery of that sidewall part 1e.

A belt clip insertion hole 1b is formed in the upper part of the bottom surface part 1m, in the center whereof an inclined part 1d and a latching piece 1c are formed.

Ribs 1o are formed on either side of the bottom surface part 1m sandwiching the latching piece 1c. A cut line 1p is formed so as to cross between the ribs 1o below the latching piece 1c. An insertion piece 1a is formed between the cut line 1p and the belt clip insertion hole 1b.

On the upper part of the sidewall part 1e, on the inner peripheral side thereof, an upper inner sidewall 1q is formed, made to stand erect so that it covers the belt clip insertion hole 1b, while on the lower part thereof is formed a lower inner sidewall 1r having an R part 1f for accommodating the tip of the belt clip 3a described below. Between the upper and lower inner sidewalls 1q and 1r is formed a center inner sidewall part is formed with a broad width.

Between the upper inner sidewall 1q and the center inner sidewall part 1s is formed a guide projection 1t for guiding the belt clip 3a. Between the center inner sidewall 1s and the lower inner sidewall 1r is formed a guide projection 1u for similarly guiding the belt clip 3a.

The ribs 1o are formed so that they extend from the upper guide projection 1t to points close to the guide projection 1u.

These ribs 1o are such that, by making a cut with a cutter from the belt clip insertion hole 1b at the top thereof to the cut line 1p, the insertion piece 1a can be cut away from the bottom surface part 1m as diagrammed in FIG. 1(E).

The belt clip engagement member 1 is integrally molded in its entirety of a synthetic resin such as vinyl chloride, polyethylene terephthalate (PET), or polypropylene, etc., which may be transparent. The belt clip engagement member 1 may have any suitable thickness, but that thickness should be capable of elastic deformation when the tip of a belt clip (not shown) is inserted in a belt clip insertion hole 1b provided as a belt clip insertion orifice, and the insertion piece 1a is pressed into the gap between the belt clip and the cardboard base made of paper or the like. When polyethylene terephthalate is employed, for example, that thickness should be 0.2 to 1.0 mm, and was made approximately 0.4 mm in a test example. The latching piece 1c has formed therein the sloping part 1d formed so that it descends in the direction in which the belt clip engagement member 1 is inserted, and is designed with a height such that it cannot easily be pulled out when engaged in the belt clip hole. The height of the sidewall part 1e should be designed so that it is higher than the height of the belt clip when the belt clip engagement member 1 is in the attached position. The strength of the belt clip engagement member 1 is also enhanced by the formation of the sidewall part 1e.

The width M of the belt clip insertion hole 1b is made larger than the width L of the belt clip to facilitate insertion of the belt clip. Also, the interval N on the inside of the lower inner sidewall 1r is made equal to or slightly larger than the width of the belt clip. The guide projection 1u can guide the belt clip, leading it automatically to the lower inner sidewall 1r, causing the inclined part 1d of the belt clip engagement member 1 to mate into the belt clip hole. The lower inner sidewall 1r and the R part 1f are formed so that they match the shape of the belt clip tip.

Thus, in the belt clip engagement member in this embodiment, by having the shape of the inside of the sidewall part 1e matched with the shape of the belt clip, in the condition wherein the belt clip engagement member 1 is attached, the gap between the edge portion of the belt clip and the lower inner sidewall 1r of the belt clip engagement member 1 is made small, so that a fingertip will no longer reach the edge of the belt clip. Thus it is possible to prevent the edge portion from being pressed open with the tip of a finger, the engagement of the latching piece 1c of the belt clip engagement member 1 in the belt clip hole from being released, and the belt clip engagement member 1 from being removed from the belt clip.

FIGS. 2(A) to 2(D) are a set of diagrams for describing one example of a procedure for assembling the tape measure display container using the belt engagement member in the first embodiment. In the diagrams, the same parts as those in FIGS. 1(A) to 1(E) are designated by the same symbols and are not further described. Item 2 is a transparent member, 2a is a concavity, 2b are folded edges, 2c is a suspension hole, 3 is a tape measure, 3a is a belt clip, 3b is a hole, 4 is a cardboard base, 4a is a cardboard base hole, and 4b is a suspension hole.

As diagrammed in FIG. 2(A), the tape measure 3 is inserted into the concavity 2a in the transparent member 2. Next, as illustrated in FIG. 2(B), the cardboard base 4 is inserted so that it is sandwiched into the folded edges 2b of the transparent member 2. During this insertion process, the belt clip 3 is led from the cardboard base hole 4a out to the back side of the cardboard base 4. The cardboard base 4 is attached as diagrammed in FIG. 2(C). The suspension hole 2c of the transparent member 2 and the suspension hole 4b of the cardboard base 4 line up. The assembly process to this point is the same as with a conventional display container. In the present invention, the belt clip engagement member 1 is attached as diagrammed in FIG. 2(C). That is, the belt clip engagement member 1 is pushed in between the cardboard base 4 and the belt clip 3a so that the tip of the belt clip 3b is inserted in the belt clip insertion hole 1b illustrated in FIGS. 1(A) to 1(E). The belt clip 3a is pushed up by the belt clip latching piece 1c, and, while the insertion piece 1a is being deformed in response thereto, the belt clip engagement member 1 is pushed in. That is, while the belt clip 3a is being pushed up from the inclined part 1d to the latching piece 1c, the belt clip 3a tries to open due to the elasticity thereof, but, because the cut line 1p is formed in the bottom surface part 1m, the insertion piece 1a is deformed, due to the elastic force of the belt clip 3a, and engages the latching piece 1c from the inclined part 1d of the belt clip 3a, wherefore it is easy to push in the belt clip engagement member 1.

Also, the belt clip 3a that is inserted through the belt clip insertion hole 1b is guided by the upper guide projection 1t that is continuous with the upper inner sidewall 1q, is further guided by the lower guide projection 1u, is inserted to the lower inner sidewall 1r, and engages the latching piece 1c.

When the latching piece 1c mates in the hole 3b in the belt clip 3a, the deformed insertion piece 1a returns to its original state, and the belt clip engagement member 1 is attached in the prescribed position. This condition is diagrammed in FIG. 2(D).

FIGS. 3(A) to 3(D) are a set of cross-sectional diagrams for describing the insertion process for the belt clip engagement member 1 in FIG. 2(C). In these diagrams, parts that are identical to those in FIGS. 1(A) to 1(E) and FIGS. 2(A) to 2(D) are designated by the same symbols and not further described. Item 5 is a securing screw.

FIG. 3(A) illustrates the condition prior to the insertion of the belt clip engagement member 1.

FIG. 3(B) illustrates the condition when starting to insert the belt clip engagement member 1. The tip of the belt clip 3a is inserted into the belt hook insertion hole 1b in the belt clip engagement member 1. The belt clip 3a is secured to the case of the tape measure 3 by the securing screw 5. In the example diagrammed here, the case is configured by two case halves, and the securing screw 5 also functions to secure the two case halves together in a single unit.

FIG. 3(C) diagrams the condition when the belt clip engagement member 1 is pushed in further. As the belt clip 3a is pushed up by the latching piece 1c, the insertion piece 1a that has the latching piece 1c attached to it is bent by the elasticity of the belt clip engagement member 1, thus allowing the belt clip engagement member 1 to be pushed in further relative to the belt clip 3a.

FIG. 3(D) illustrates the condition with the belt clip engagement member 1 attached. The latching piece 1c is latched in the hole in the belt clip 3a. In this condition wherein the belt clip engagement member 1 latched, the belt clip engagement member 1 is bonded to the cardboard base 4 using an adhesive or the like.

As depicted in FIG. 2(D) and FIG. 3(D), in the condition wherein the belt clip engagement member 1 is attached, the tape measure 3 cannot be removed from the cardboard base 4 because the belt clip engagement member 1 is larger than the cardboard base hole 4a. Also, because the latching piece 1c of the belt clip engagement member 1 is latched in the hole 3b in the belt clip 3a, the belt clip engagement member 1 cannot be removed, even if the belt clip engagement member 1 is pulled in the opposite direction from the direction of insertion.

Given such an engagement structure as this, the sidewall 1e may be absent from the belt clip engagement member 1. By providing the sidewall 1e, however, the advantage is gained of being able to prevent the belt clip 3b from directly contacting and scratching other display containers containing tape measures, or other products, etc.

Accordingly, the sidewall part 1e need not necessarily be formed so that it completely encloses the belt clip in the mounted condition. It may be provided at portions of the periphery of the belt clip, as by being formed on two sides parallel to the direction of insertion, so that the edges of the belt clip do not make contact with other products, etc., or it may be provided at portions of the entire circumference.

Further, when the tape measure 3 is removed from the cardboard base 4 after purchase, the insertion piece 1a can be cut away from the bottom surface part 1m by making cuts with a cutter along the ribs 1o from both sides of the belt clip insertion hole 1b to the cut line 1p. The tape measure 3 can be removed from the cardboard base 4 in this manner.

Figure 4B:
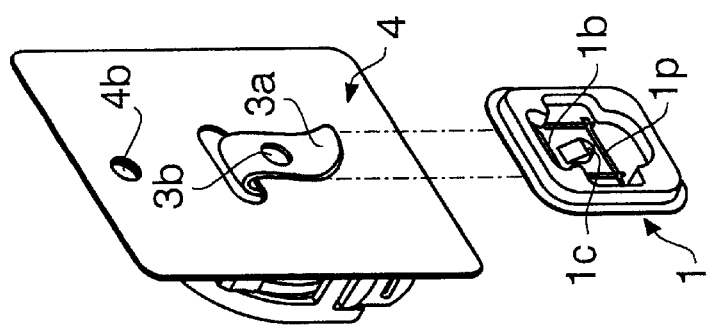
Figure 4A:
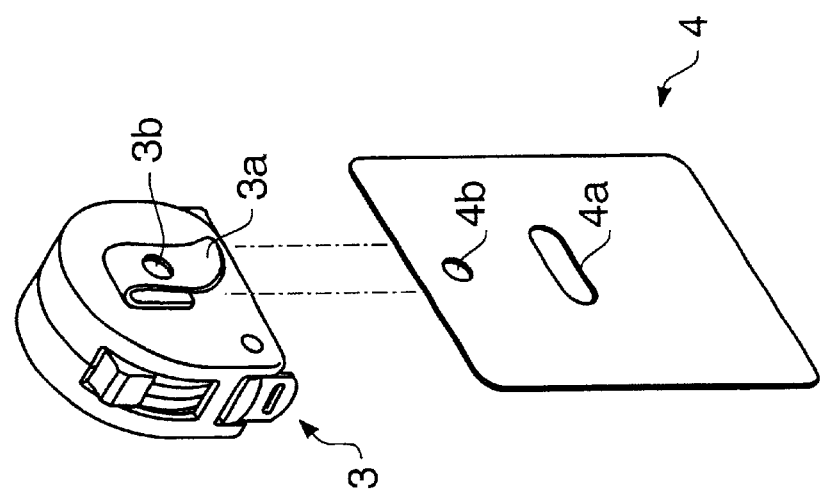

FIGS. 4(A) to 4(C) are a set of diagrams for describing another example of a procedure for assembling a tape measure display container using the belt clip engagement member in the first embodiment. In these diagrams, parts that are identical to those in FIGS. 1(A) to 1(E) and FIGS. 2(A) to 2(D) are designated by the same symbols and not further described.

The example diagrammed here is one applied to a packaging form which does not use a transparent member. As shown in FIG. 4(A), the tape measure 3 is attached to the cardboard base 4 so that the belt clip 3a is led out from the cardboard base hole 4a to the back side of the cardboard base 4. This is the situation with a conventional display container, wherewith the tape measure 3 can easily be removed from the cardboard base 4. In the present invention, the belt clip engagement member 1 is attached as diagrammed in FIG. 4(B). The belt clip engagement member 1 is attached in the same manner as described in conjunction with FIG. 2(C) and FIGS. 3(A) to (D). FIG. 4(C) diagrams the condition wherein the belt clip engagement member 1 is attached. In this condition wherein the belt clip engagement member 1 is attached, the tape measure 3 cannot be removed from the cardboard base 4 because the belt clip engagement member 1 is larger than the cardboard base hole 4a. Also, because the latching piece 1c of the belt clip engagement member 1 is latched in the hole 3b in the belt clip 3a, the belt clip engagement member 1 cannot be removed, even if the belt clip engagement member 1 is pulled in the opposite direction from the direction of insertion, as was explained in conjunction with FIGS. 2(A) to 2(D) and FIGS. 3(A) to 3(D).

FIGS. 5(A) to 5(D) are a set of diagrams for describing a second embodiment of a belt clip engagement member used in the display container of the present invention. FIG. 5(A) is a perspective view, FIG. 5(B) is a plan, and FIG. 5(C) and FIG. 5(D) are plans diagramming relationships with the belt clip. It should be noted that cross sectional views of the belt clip engagement member of this embodiment are similar to those shown in FIGS. 1(C) and 1(D) so that the cross sectional views are not included. In these diagrams, parts that are identical to those in FIGS. 1(A) to 1(E) and FIGS. 2(A) to 2(D) are designated by the same symbols and not further described. Item 1f is an R portion and 1g is a tapered portion.

In this embodiment, as compared with the belt clip engagement member in the first embodiment, only the shape has been changed, that is, only the shape of the inside of the sidewall part 1e has been changed. The shape of the inside of the sidewall part 1e is such that, as illustrated in FIGS. 5(A) and 5(B), the width M of the belt clip insertion hole 1b formed in the insertion piece 1a is made larger than the width L of the belt clip 3a to facilitate easy insertion of the belt clip 3a. Accordingly, the interval inside the two sides of the sidewall part 1e is larger than the width of the belt clip 3a in the vicinity of the belt clip insertion hole 1b. The interval inside the two sides of the sidewall part 1e is narrowed from that portion having the large interval, by a tapered portion 1g, to form the interval N. By forming the tapered portion 1g, the belt clip 3a inserted from the belt clip insertion hole 1a made large to facilitate easy insertion of the belt clip 3a can be guided automatically to the middle of the belt clip engagement member 1, and the sloping part 1d of the belt clip engagement member 1 can be mated with the hole 3b of the belt clip.

The interval N inside the two sides of the sidewall part 1e is made either the same as or slightly larger than the width L of the belt clip 3a. The R portion 1f that is a rounded portion is matched to the shape of the tip portion of the belt clip 3a.

Thus, in the belt clip engagement member in this embodiment, by matching the shape inside the sidewall part 1e to the shape of the belt clip 3a, in the condition wherein the belt clip engagement member 1 is attached, the gap between the edges of the belt clip and the R portion 1f of the belt clip engagement member 1 becomes smaller, so that a person's fingertips no longer reach the edges of the belt clip. This prevents the belt clip engagement member 1 from being removed from the belt clip by pushing the edges out with the fingertips and releasing the engagement between the belt clip hole 3b and the latching piece 1c of the belt clip engagement member 1. This is particularly effective with the packaging form described with FIGS. 4(A) to 4(C) wherein no transparent member is used.

Figure 6C:
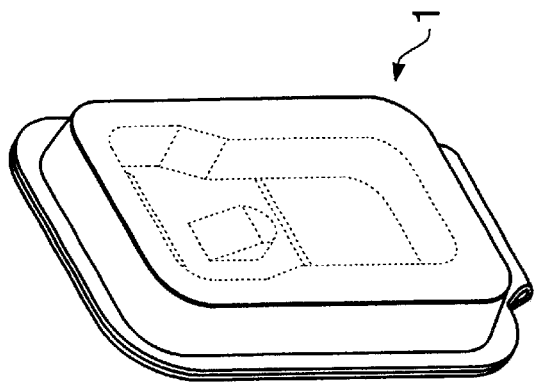
FIGS. 6(A) to 6(C) are a set of diagrams for describing a third embodiment of a belt clip engagement member used in the display container according to the present invention; specifically
Figure 6B:
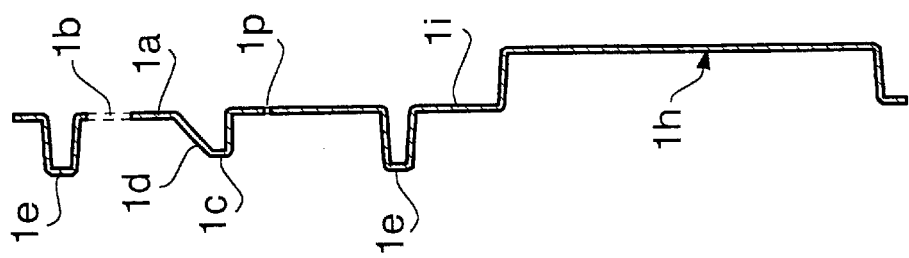
Figure 6A:
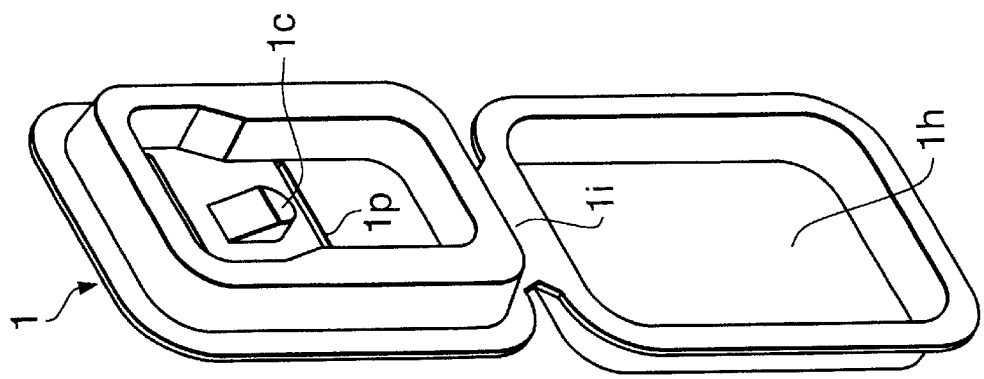

FIGS. 6(A) to 6(C) are a set of diagrams for describing a third embodiment of a belt clip engagement member used in the display container of the present invention. FIG. 6(A) is a perspective view, and FIG. 6(B) is a vertical cross-section. In these diagrams, parts that are identical to those in FIGS. 1(A) to 1(E), FIGS. 2(A) to 2(D), and FIGS. 5(A) to 5(D) are designated by the same symbols and not further described. Item 1h is a cover member and 1i is a connecting piece.

In this embodiment, the cover member 1h is provided for the belt clip engagement member 1 and connected thereto by the connecting piece 1i. The belt clip engagement member 1 and the cover member 1h may be fabricated separately, but it is preferable to provide the connecting piece 1i and form the two parts integrally. It is then easy to cover the belt clip engagement member 1 with the cover member 1h. The belt clip engagement member 1 here is the same as that described in the second embodiment, but it may instead be the same as that described in the first embodiment. The cover member 1h is fabricated so that it fits about the outer circumference of the sidewall part 1e of the belt clip engagement member 1. The dimensions may be determined so that this is a tight fit to make it difficult to break the engagement after the engagement is made.

FIGS. 7(A) to 7(D) are a set of diagrams for describing one example of a procedure for assembling a tape measure display container using the belt engagement member in the third embodiment. In these diagrams, parts that are identical to those in FIGS. 1(A) to 1(E), FIGS. 2(A) to 2(D), and FIGS. 6(A) to 6(C) are designated by the same symbols and not further described.

As diagrammed in FIG. 7(A), the tape measure 3 is inserted in the concavity 2a in the transparent member 2. Next, as diagrammed in FIG. 7(B), the cardboard base 4 is inserted so that it is sandwiched into the folded edges 2b of the transparent member 2. During this insertion process, the belt clip 3 is led from the cardboard base hole 4a out to the back side of the cardboard base 4. The cardboard base 4 is attached as diagrammed in FIG. 7(C). The suspension hole 2c of the transparent member 2 and the suspension hole 4b of the cardboard base 4 line up. The assembly process to this point is the same as that described in conjunction with FIGS. 2(A) to 2(D). The belt clip engagement member 1, as diagrammed in FIGS. 7(B) and 7(C), is covered by the cover member 1h. Next, the belt clip engagement member 1 is attached as diagrammed in FIG. 7(C). That is, the belt clip engagement member 1 is pushed in between the cardboard base 4 and the belt clip 3a so that the tip of the belt clip 3a is inserted in the belt clip insertion hole 1b. The belt clip 3a is pushed up by the latching piece 1c of the belt clip engagement member 1 and, as the belt clip engagement member 1 is deformed in response thereto, the belt clip engagement member 1 with the attached cover is pushed in. The way the belt clip engagement member 1 is pushed in is the same as described in conjunction with FIGS. 2(A) to 2(D), and the belt clip engagement member 1 is attached in the prescribed position as diagrammed in FIG. 7(D).

Figure 8B:
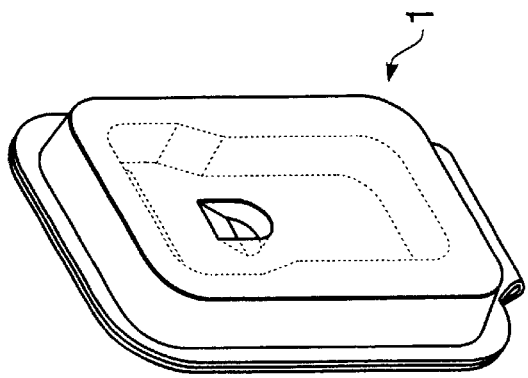
FIGS. 8(A) and 8(B) are a set of perspective views for describing a fourth embodiment of a belt clip engagement member used in the display container of the present invention; specifically
Figure 8A:
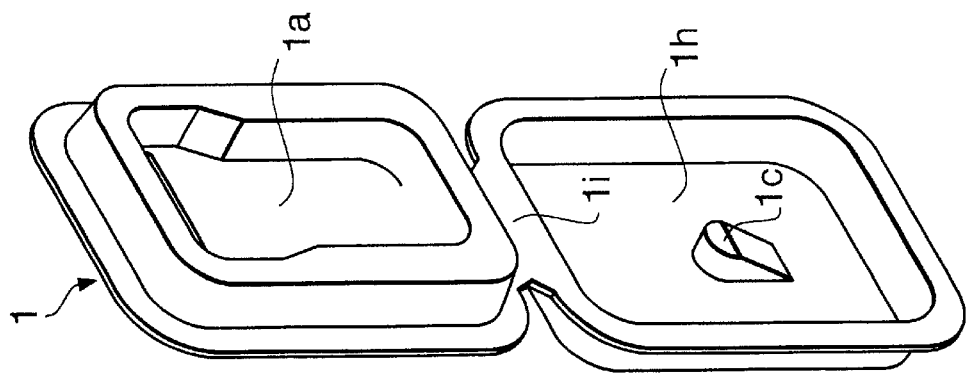

FIGS. 8(A) and 8(B) are a set of perspective diagrams for describing a fourth embodiment of a belt clip engagement member used in the display container of the present invention. In these diagrams, parts that are identical to those in FIGS. 1(A) to 1(E), FIGS. 2(A) to 2(D), FIGS. 5(A) to 5(D), and FIGS. 6(A) to 6(C) are designated by the same symbols and not further described.

This embodiment is only different from the third embodiment in that the belt clip engagement member thereof has the latching piece 1c formed on the cover member 1h. However, as compared with the third embodiment, if the cover member 1h is removed, it is then easy to remove the belt clip engagement member 1, wherefore, the belt clip engagement member 1 in this embodiment should be fabricated with exacting dimensions, so that the cover member 1h is difficult to remove when that cover member 1h is in the covering condition, making it difficult to remove the cover member 1h once it has been mated. The cover member 1h may also be bonded to the belt clip engagement member 1 with an adhesive.

FIGS. 9(A) to 9(D) are a set of perspective diagrams for describing one example of a procedure for assembling a tape measure display container using the belt engagement member in the fourth embodiment. FIGS. 10(A) to 10(D) are a set of cross-sections thereof. In these diagrams, parts that are identical to those in FIGS. 1(A) to 1(E), FIGS. 2(A) to 2(D), FIGS. 6(A) to 6(C), and FIGS. 8(A) to 8(B) are designated by the same symbols and not further described.

Figure 9D:
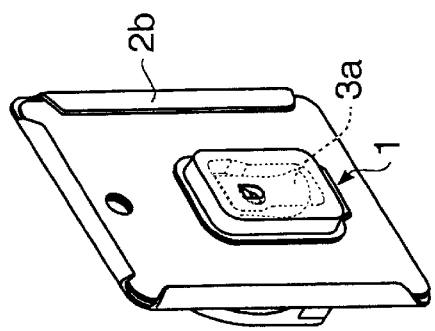
FIGS. 9(A) to 9(D) are a set of perspective diagrams for describing one example of a procedure for assembling a tape measure display container using the belt engagement member in the fourth embodiment; specifically
Figure 9C:
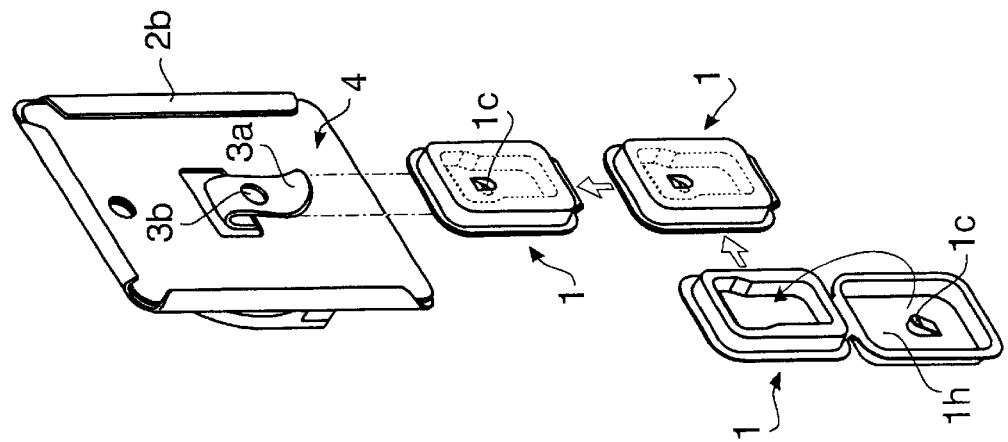
Figure 9B:
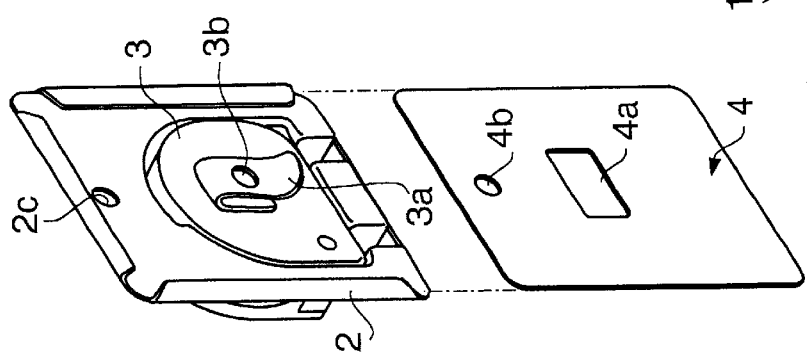
Figure 9A:
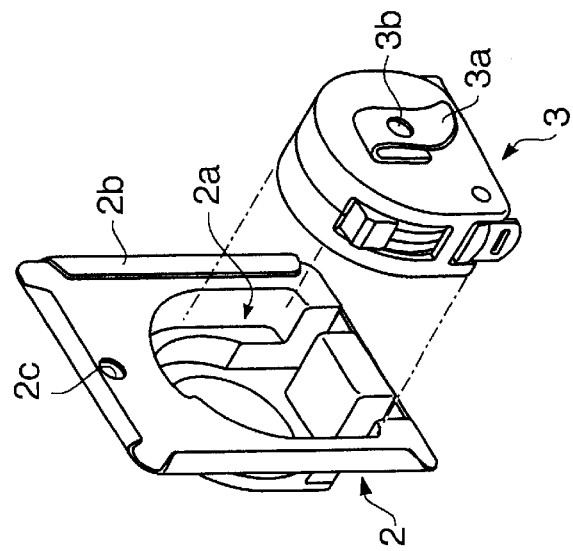

As diagrammed in FIG. 9(A), the tape measure 3 is inserted in the concavity 2a in the transparent member 2. Next, as diagrammed in FIG. 9(B), the cardboard base 4 is inserted so that it is sandwiched into the folded edges 2b of the transparent member 2. During this insertion process, the belt clip 3 is led from the cardboard base hole 4a out to the back side of the cardboard base 4. The cardboard base 4 is attached as diagrammed in FIG. 9(C). The suspension hole 2c of the transparent member 2 and the suspension hole 4b of the cardboard base 4 line up. The assembly process to this point is the same as that described in conjunction with FIGS. 2(A) to 2(D). The belt clip engagement member 1, as diagrammed in FIGS. 9(B) and 9(C), is covered by the cover member 1h. Next, the belt clip engagement member 1 is attached as diagrammed in FIG. 9(C). As diagrammed in FIG. 10(A), the belt clip engagement member 1 is pushed in between the cardboard base 4 and the belt clip 3a so that the tip of the belt clip 3a is inserted in the belt clip insertion hole 1b. The latching piece 1c comes up against the belt clip 3a and, when the belt clip engagement member 1 is pushed further, the latching piece 1c is pushed up by the belt clip 3a as diagrammed in FIG. 10(C). By the sloping part being provided in the latching piece 1c of the belt clip engagement member 1, it is easy to push the belt clip engagement member 1 in. When the latching piece 1c mates in the hole 3b in the belt clip 3a, the latching piece 1c that has been pushed up returns to its original state by the elastic force, and the belt clip engagement member 1 is attached in the prescribed position. This condition is diagrammed in FIG. 10(D) and FIG. 9(D).

With the belt clip engagement member in this embodiment, the cover member 1h may be closed after the belt clip engagement member 1 has been attached. When attached in this manner, there is no need to impart elasticity about the periphery of the latching piece 1c.

FIGS. 11(A) to 11(D) are a set of perspective diagrams for describing a fifth embodiment of a belt clip engagement member used in the display container of the present invention together with one example of a procedure for assembling a tape measure display container, and FIGS. 12(A) to 12(D) are a set of cross-sectional diagrams therefor. In these diagrams, parts that are identical to those in FIGS. 1(A) to 1(E) and FIGS. 2(A) to 2(D) are designated by the same symbols and not further described. Item 1j is a cover and 1k is a belt clip insertion end.

In the belt clip engagement member in this embodiment, the belt clip engagement member 1 is provided with a cover 1*j* and configured in a box shape. The belt clip 3*a* insertion side is open, and no belt clip insertion hole such as that described in the embodiments described earlier is formed in the insertion piece 1*a*. For the belt clip insertion orifice, a cut-out is made all the way to a position back further than the front end of the cover 1*j*, forming the belt clip insertion end 1*k*. Alternatively, a belt clip insertion hole may be formed in place of the belt clip insertion end 1*k*. The latching piece 1*c* provided behind the belt clip insertion end 1*k* is the same as the latching piece described in conjunction with FIGS. 1(A) to 1(E), and a sloping part is formed in the front side.

Figure 11D:
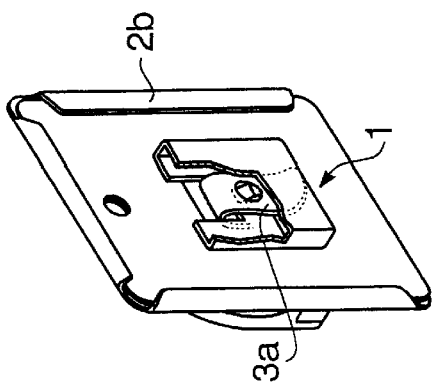
FIGS. 11(A) to 11(D) are a set of perspective diagrams for describing a fifth embodiment of a belt clip engagement member used in the display container of the present invention together with one example of a procedure for assembling a tape measure display container; specifically
Figure 11C:
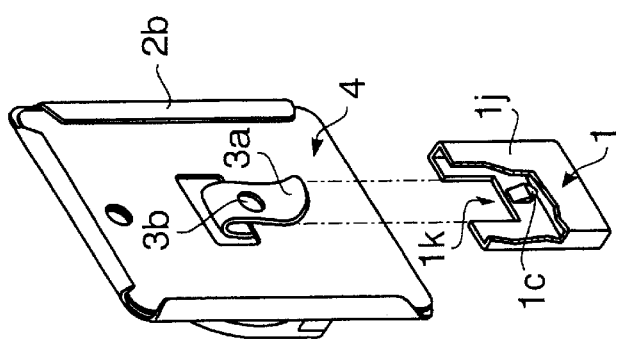
Figure 11B:
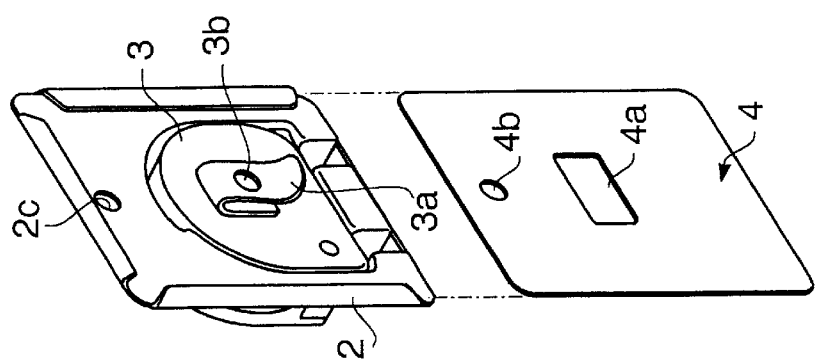
Figure 11A:
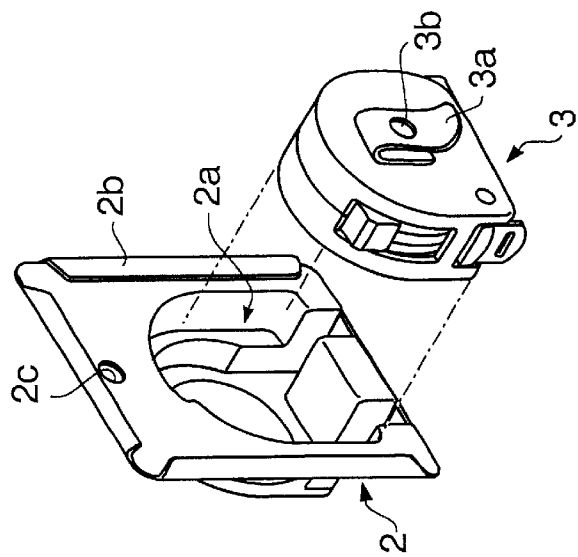
Figure 12D:
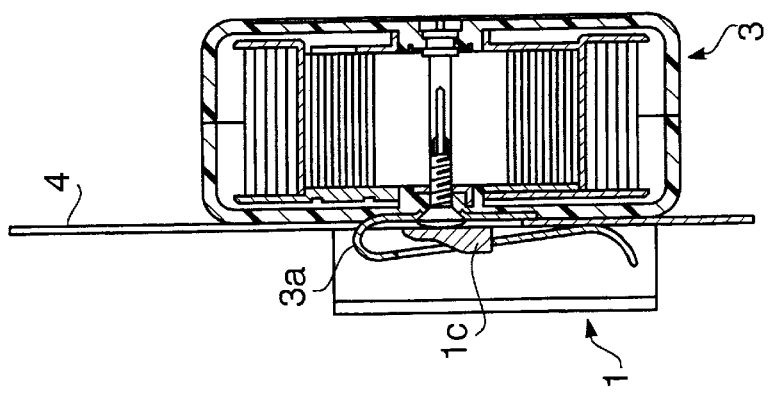
FIGS. 12(A) to 12(D) are a set of cross-sectional diagrams for describing the fifth embodiment of a belt clip engagement member used in the display container of the present invention together with one example of a procedure for assembling a tape measure display container; specifically
Figure 12C:
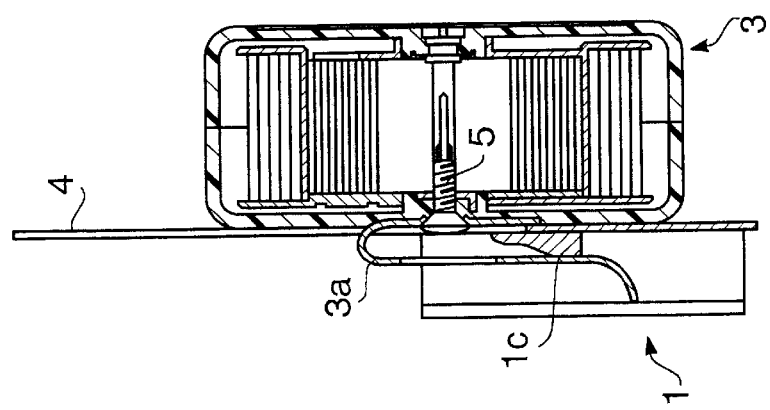
Figure 12B:
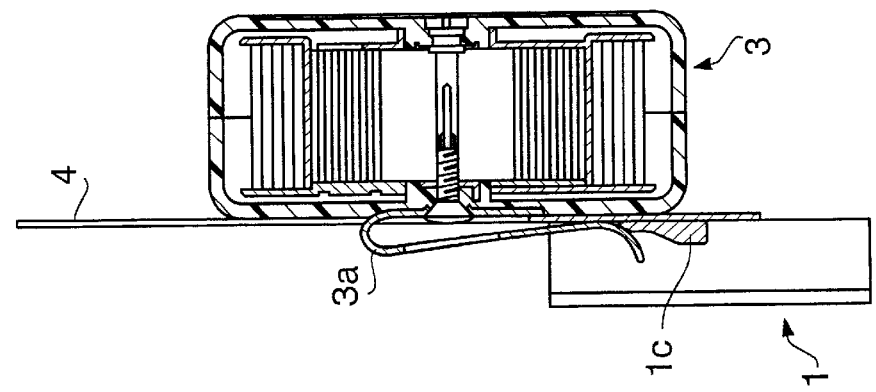
Figure 12A:
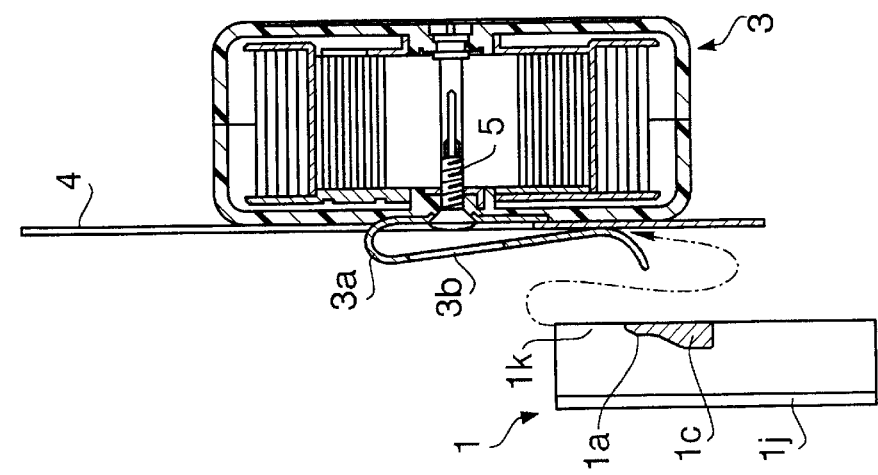

As diagrammed in FIG. 11(A), the tape measure 3 is inserted in the concavity 2*a* in the transparent member 2. Next, as diagrammed in FIG. 11(B), the cardboard base 4 is inserted so that it is sandwiched into the folded edges 2*b* of the transparent member 2. During this insertion process, the belt clip 3 is led from the cardboard base hole 4*a* out to the back side of the cardboard base 4. The cardboard base 4 is attached as diagrammed in FIG. 11(C). The suspension hole 2*c* of the transparent member 2 and the suspension hole 4*b* of the cardboard base 4 line up. The assembly process to this point is the same as that described in conjunction with FIGS. 2(A) to 2(D). The belt clip engagement member 1 is inserted as diagrammed in FIG. 11(C). That is, as diagrammed in FIG. 12(A), the insertion piece 1*a* of the belt clip engagement member 1 is pushed in between the cardboard base 4 and the belt clip 3*a* so that the belt clip insertion end 1*k* is inserted between the tip of the belt clip 3*a* and the cardboard base 4. As diagrammed in FIG. 12(B), the latching piece 1*c* comes up against the belt clip 3*a*, and when the insertion is continued further, the belt clip 3*a* is pushed up by the latching piece 1*c* of the belt clip engagement member 1, as diagrammed in FIG. 12(C). Because the sloping part is provided in the latching piece 1*c* of the belt clip engagement member 1, it is easy to push in the belt clip engagement member 1. When the latching piece 1*c* is mated in the hole 3*b* of the belt clip 3*a*, the belt clip 3*a* that has been pushed up returns to its original state by the elastic force, and the belt clip engagement member 1 is attached in the prescribed position. This condition is diagrammed in FIG. 12(D) and FIG. 11(D).

With this embodiment, configured such that the belt clip engagement member 1 is inserted by the belt clip insertion end 1*k*, without a belt clip insertion hole being provided, there is no need to cause deformation in the vicinity of the latching piece 1*c*, wherefore there is also no need to impart elasticity about the periphery of the latching piece 1*c*.

FIGS. 13(A) to 13(D) are a set of perspective views for describing a sixth embodiment of a belt clip engagement member used in the display container of the present invention together with one example of a procedure for assembling a tape measure display container, and FIGS. 14(A) to 14(D) are a set of cross-sections therefor. In these diagrams, parts that are identical to those in FIGS. 1(A) to 1(E), FIGS. 2(A) to 2(D), FIGS. 11(A) to 11(D), and FIGS. 12(A) to 12(D) are designated by the same symbols and not further described. Item 1*m* is a cut channel.

In this embodiment, the latching piece 1*c* is provided on the cover 1*j* of the belt clip engagement member 1 of the fifth embodiment, and elasticity is imparted to the base thereof, wherefore a cut is made about three sides of the latching piece 1*c* to form the cut channel 1*m*. The latching piece 1*c* has a sloping part provided on the front side, in the same way as the latching piece described in conjunction with FIGS. 1(A) to 1(E).

Figure 13D:
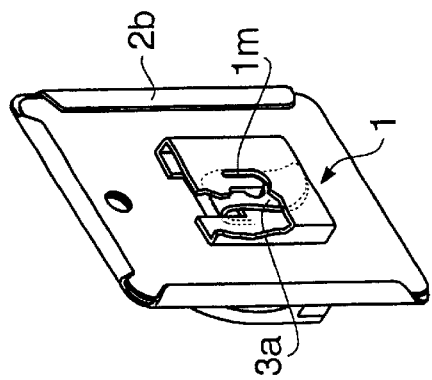
FIGS. 13(A) to 13(D) are a set of perspective diagrams for describing a sixth embodiment of a belt clip engagement member used in the display container according to the present invention together with one example of a procedure for assembling a tape measure display container; specifically
Figure 13C:
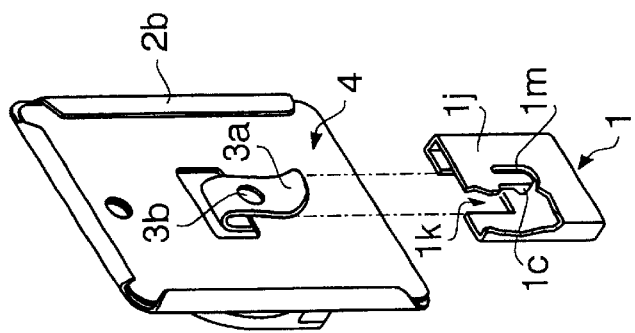
Figure 13B:
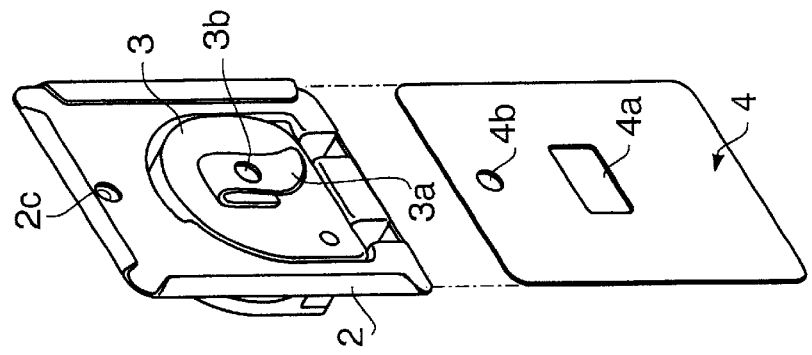
Figure 13A:
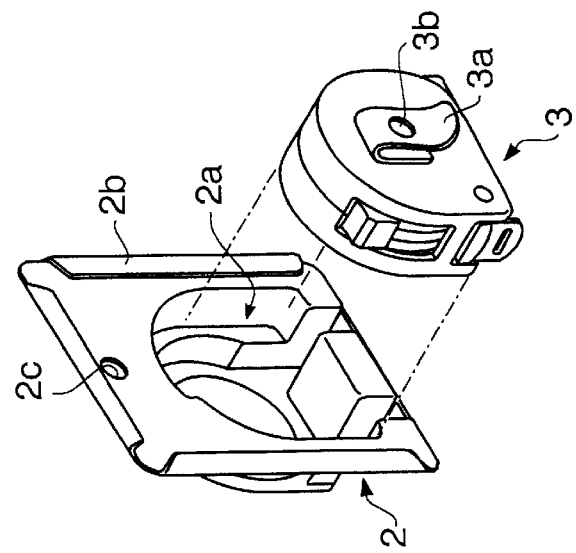
Figures 14A, 14B, 14C, 14D:
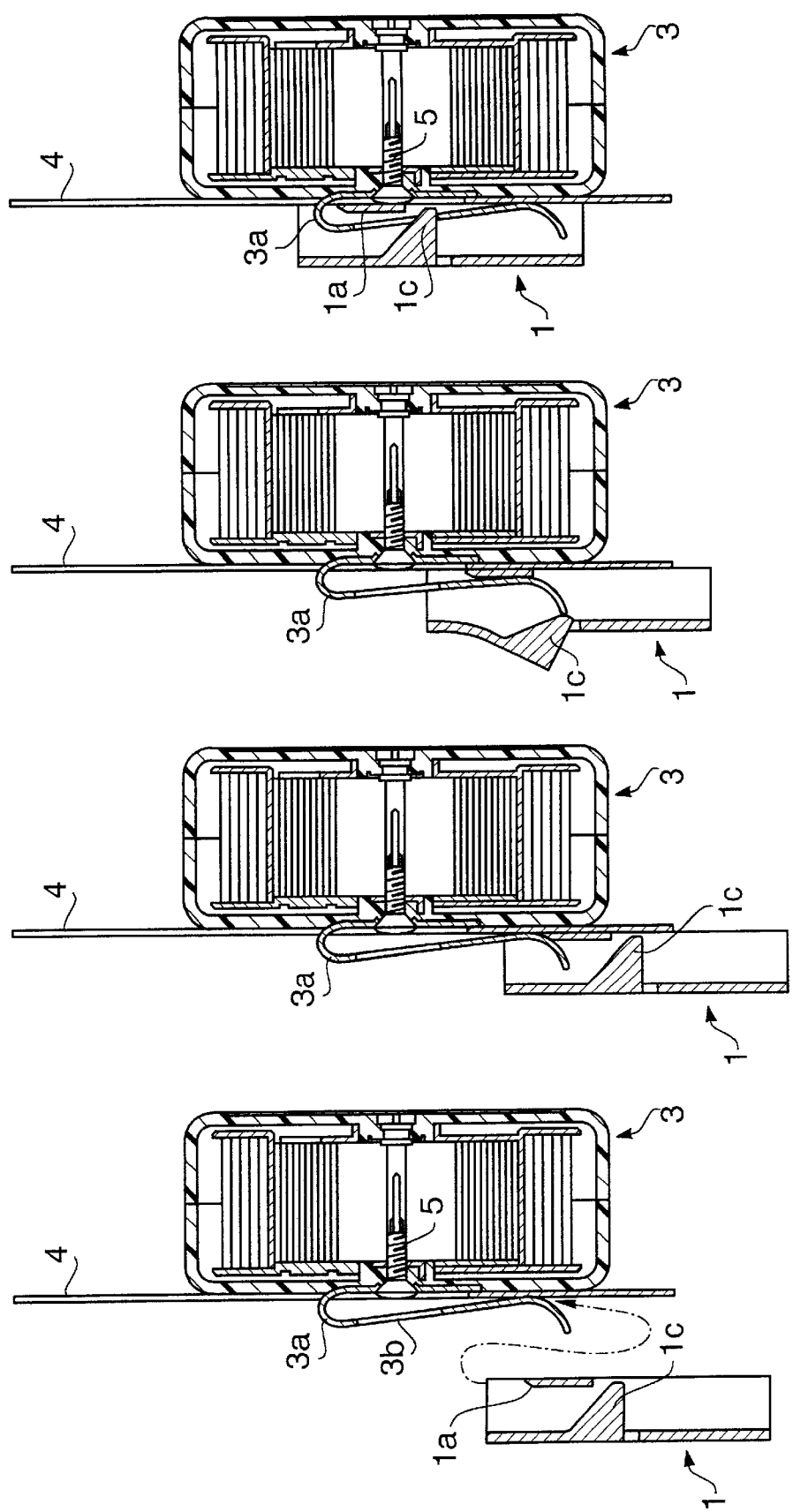
FIGS. 14(A) to 14(D) are a set of cross-sectional diagrams for describing the sixth embodiment of a belt clip engagement member used in the display container of the present invention together with one example of a procedure for assembling a tape measure display container; specifically

As diagrammed in FIG. 13(A), the tape measure 3 is inserted in the concavity 2*a* in the transparent member 2. Next, as diagrammed in FIG. 13(B), the cardboard base 4 is inserted so that it is sandwiched into the folded edges 2*b* of the transparent member 2. During this insertion process, the belt clip 3 is led from the cardboard base hole 4*a* out to the back side of the cardboard base 4. The cardboard base 4 is attached as diagrammed in FIG. 13(C). The suspension hole 2*c* of the transparent member 2 and the suspension hole 4*b* of the cardboard base 4 line up. The assembly process to this point is the same as that described in conjunction with FIGS. 2(A) to 2(D). The belt clip engagement member 1 is inserted as diagrammed in FIG. 13(C). That is, as diagrammed in FIG. 14(A), the insertion piece 1*a* of the belt clip engagement member 1 is pushed in between the cardboard base 4 and the belt clip 3*a* so that the belt clip insertion end 1*k* is inserted between the tip of the belt clip 3*a* and the cardboard base 4. As diagrammed in FIG. 14(B), the latching piece 1*c* comes up against the belt clip 3*a*, and when the insertion is continued further, the latching piece 1*c* is pushed up by the belt clip 3*a*, as diagrammed in FIG. 14(C). Because the sloping part is provided in the latching piece 1*c* of the belt clip engagement member 1, it is easy to push in the belt clip engagement member 1. When the latching piece 1*c* is mated in the hole 3*b* of the belt clip 3*a*, the latching piece 1*c* that has been pushed up returns to its original state by the elastic force, and the belt clip engagement member 1 is attached in the prescribed position. This condition is diagrammed in FIG. 14(D) and FIG. 13(D).

Thus, in any of the embodiments, by attaching the belt clip engagement member 1, removing the tape measure from the cardboard base is made very difficult, and theft by removing the tape measure from the cardboard base can be prevented.

The purchaser can remove the tape measure from the cardboard base for use by breaking the belt clip engagement member 1.

The illustrated and described tape measure display container is disclosed in Japanese Patent Application No. 11-68962 filed on Mar. 15, 1999, and the entire disclosure thereof is incorporated herein by reference.

What is claimed is:

1. A tape measure display container comprising:
   a cardboard base having a hole unit therein, a belt clip of a tape measure being adapted to be inserted in the hole unit so that said belt clip can be led out to back side of said cardboard base; and
   belt clip engagement means for engaging said belt clip that has been so led out to said back side and securing said tape measure to back side of said cardboard base, said belt clip engagement means including:
   a belt clip insertion hole for insertion of said belt clip that has been led out,
   an insertion unit that is inserted between said inserted belt clip and back side of said cardboard base, and
   a latching piece that is latched in hole of said belt clip when said insertion unit has been inserted.

2. The tape measure display container according to claim 1, wherein said belt clip engagement means is elastically deformable in the vicinity of said latching piece.

3. The tape measure display container according to claim 1, wherein said belt clip engagement means includes:
   a bottom surface part;
   an inner wall part that encloses said bottom surface part;
   said belt clip insertion hole formed in said bottom surface part;
   said latching piece formed such that it rises up in center of said bottom surface part; and a cut line, formed in said bottom surface unit, which allows deformation of said insertion unit.

4. A tape measure display container comprising:
a cardboard base having a hole unit therein, a belt clip of a tape measure being adapted to be inserted in the hold unit so that said belt clip can be led out to back side of said cardboard base; and
a belt clip engagement member for engaging said belt clip that has been so led out to said back side and securing said tape measure to back side of said cardboard base, said belt clip engagement member including:
a bottom surface part,
an inner wall part that-encloses said bottom surface part,
a belt clip insertion hole formed in said bottom surface part,
a latching piece for engaging hole in said belt clip, formed such that it rises up in center of said bottom surface part, and
a cut line, formed in said bottom surface unit, which allows deformation of said insertion unit.

5. The tape measure display container according to claim 4, wherein said latching piece has an inclined part on side of said belt clip insertion hole.

6. The tape measure display container according to claim 4, wherein ribs are formed in said bottom surface part for guiding said belt clip when being inserted.

7. A tape measure display container comprising:
a cardboard base having a hole unit therein, a belt clip of a tape measure being adapted to be inserted in the hole unit so that said belt clip can be led out to back side of said cardboard base; and
a belt clip engagement member for engaging said belt clip that has been so led out to said back side and securing said tape measure to back side of said cardboard base, said belt clip engagement member including:
a bottom surface part,
an inner wall part that encloses said bottom surface part,
a belt clip insertion hole formed in said bottom surface part,
a latching piece for engaging hole in said belt clip, formed such that it rises up in center of said bottom surface part, and
a sidewall unit that has a tapered portion formed for guiding said belt clip when being inserted from said belt clip insertion hole.

8. The tape measure display container according to claim 7, wherein a cut line allowing deformation of said insertion unit is formed in said bottom surface unit.

9. A tape measure display container comprising:
a cardboard base having a hole unit therein such that a belt clip of a tape measure can be inserted in the hold unit and said belt clip can be led out to back side of said cardboard base; and
a belt clip engagement member for engaging said belt clip that has been so led out to said back side and securing said tape measure to back side of said cardboard base, said belt clip engagement member including:
a transparent member, edges of said transparent member being folded and joined to circumferential edge of said cardboard base,
and said transparent member having a concavity formed therein capable of accommodating said tape measure,
a bottom surface part,
an inner wall part that encloses said bottom surface part,
a belt clip insertion hole formed in said bottom surface part,
a latching piece for engaging hole in said belt clip, formed such that it rises up in center of said bottom surface part, and
a cut line, formed in said bottom surface unit, which allows deformation of said insertion unit.

10. A tape measure display container comprising:
a cardboard base having a hole unit therein such that a belt clip of a tape measure can be inserted in the hold unit and said belt clip can be led out to back side of said cardboard base;
a belt clip engagement member for engaging said belt clip that has been so led out to said back side and securing said tape measure to back side of said cardboard base, said belt clip engagement member including:
a transparent member, and edges of said transparent member being folded and joined to circumferential edge of said cardboard base, and said transparent member having a concavity formed therein capable of accommodating said tape measure,
a cover member linked to said belt clip engagement member, said cover member having a latching piece for engaging hole in said belt clip,
a bottom surface part,
an inner wall part that encloses said bottom surface part, and
a belt clip insertion hole formed in said bottom surface part.

11. The tape measure display container according to claim 10, wherein said latching piece has an inclined part for guiding said belt clip.

12. A tape measure accommodated in a tape measure display container, said tape measure display container including:
a cardboard base having a hole unit therein, a belt clip of a tape measure being adapted to be inserted in the hole unit so that said belt clip can be led out to back side of said cardboard base; and
a belt clip engagement member for engaging said belt clip that has been so led out to said back side and securing said tape measure to back side of said cardboard base, said belt clip engagement member including:
a bottom surface part,
an inner wall part that encloses said bottom surface part,
a belt clip insertion hole formed in said bottom surface part,
a latching piece for engaging hole in said belt clip, formed such that it rises up in center of said bottom surface part, and
a sidewall unit that has a tapered portion formed for guiding said belt clip when being inserted from said belt clip insertion hole.

* * * * *

UNITED STATES PATENT AND TRADEMARK OFFICE
CERTIFICATE OF CORRECTION

PATENT NO.    : 6,401,921 B1
DATED         : June 11, 2002
INVENTOR(S)   : Tsutomu Usami It is certified that error appears in the above-identified patent and that said Letters Patent is hereby corrected as shown below:

<u>Column 5,</u>
Line 5, delete "it" and insert therefor -- 1t --.
Line 23, delete "is" and insert therefor -- 1s --.

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,401,921 B1
DATED        : June 11, 2002
INVENTOR(S)  : Tsutomu Usami It is certified that error appears in the above-identified patent and that said Letters Patent is hereby corrected as shown below:

<u>Column 5,</u>
Line 25, delete "it" and insert therefor -- 1t --.
Line 23, delete "is" and insert therefor -- 1s --.

This certificate supersedes the Certificate of Correction issued January 14, 2003.

Signed and Sealed this

Fifteenth Day of April, 2003

JAMES E. ROGAN
*Director of the United States Patent and Trademark Office*